(12) United States Patent
O'Riordan et al.

(10) Patent No.: US 9,501,598 B1
(45) Date of Patent: Nov. 22, 2016

(54) SYSTEM AND METHOD FOR ASSERTION PUBLICATION AND RE-USE

(71) Applicant: Cadence Design Systems, Inc.

(72) Inventors: Donald J. O'Riordan, Sunnyvale, CA (US); Vuk Borich, San Jose, CA (US); Keith Dennison, Edinburgh (GB)

(73) Assignee: Cadence Design Systems, Inc., San Jose, CA (US)

( * ) Notice: Subject to any disclaimer, the term of this patent is extended or adjusted under 35 U.S.C. 154(b) by 122 days.

(21) Appl. No.: 14/493,240

(22) Filed: Sep. 22, 2014

(51) Int. Cl.
*G06F 17/50* (2006.01)

(52) U.S. Cl.
CPC ....... *G06F 17/5063* (2013.01); *G06F 17/5068* (2013.01); *G06F 17/5081* (2013.01); *G06F 17/5036* (2013.01); *G06F 2217/00* (2013.01)

(58) Field of Classification Search
None
See application file for complete search history.

(56) References Cited

U.S. PATENT DOCUMENTS

| | | | |
|---|---|---|---|
| 8,234,617 B2* | 7/2012 | Chetput | G06F 17/5022 716/106 |
| 8,533,647 B1 | 9/2013 | Gangadharan et al. | |
| 8,682,631 B2 | 3/2014 | Chang et al. | |
| 9,009,635 B1* | 4/2015 | O'Riordan | G06F 17/5022 716/106 |
| 9,032,347 B1* | 5/2015 | O'Riordan | G06F 17/5022 716/104 |
| 9,047,424 B1* | 6/2015 | Baker | G06F 17/5036 |
| 9,075,935 B2* | 7/2015 | Vasudevan | G06F 17/50 |
| 2011/0054875 A1* | 3/2011 | Chang | G06F 17/5036 703/14 |
| 2012/0198411 A1 | 8/2012 | Bhushan et al. | |
| 2013/0019216 A1* | 1/2013 | Vasudevan | G06F 17/504 716/106 |

OTHER PUBLICATIONS

Ajeetha Kumari, "Property Specification Language Tutorial (Part 3)", PSL Reference Manual, Property Expressions: Verification Layer, Project VeriPage, PSL: Verification and Modeling Layers, Jun. 9, 2004, (6) pages.
"Separation of Concerns," http://en.wikipedia.org/wiki/Separation_of_concerns, last modified Mar. 16, 2014, pp. 1-7.

* cited by examiner

*Primary Examiner* — Leigh Garbowski
(74) *Attorney, Agent, or Firm* — Andrews Kurth Kenyon LLP

(57) ABSTRACT

A system and method for managing analog assertion publication and re-use for analog and mixed-signal circuit designs. A graphical user interface based environment allows circuit designers to create, verify, formalize, and publish an analog assertion for a circuit design for subsequent re-use with another circuit design. Embodiments enable analog assertion handling while simultaneously depicting a circuit design in a schematic and/or layout editor window. Embodiments capture referenced circuit objects and parameterize the assertion for numerical values and connectivity. A designer may publish the assertion and annotate it with descriptive metadata, possibly with other assertions of related functionality, to a library accessible by users of analog design and verification tools. Another designer may re-use the assertion by searching for and selecting a relevant published assertion, instantiating and binding the selected assertion to specific elements of a second circuit design, and verify the assertion for the second circuit design.

17 Claims, 18 Drawing Sheets

FIG. 3

| Constraint (1) | [All Parameters] |
|---|---|
| Name | assert1 |
| Owner | bhvLib.test_sd_adc_don.constraint |
| Enabled | true |
| Notes | |
| *Verification...* | assert |
| Property | abs(V(i2)) ◊ 1.40000*V(ref) |
| *Property N...* | always |
| *Coding E...* | |
| Description | Assert that integrator output i2 is bounde... |
| Message | integ2_bounded property failed |

```xml
<?xml version="1.0" encoding="UTF-8"?>
<dataformat type="resuableAssertionData">
    <pattern>reuseableassertions.xml</pattern>
    <defaulteditor>ReuseableAssertionEditor"</defaulteditor>
    <viewtype>reuseableAssertions</viewtype>
    <comanagedset>
        <file>reusableassertions.xml</file>
        <file>master.tag</file>
    </comanagedset>
    <viewalias>
        <reusableassertions>reusableAssertionData</reusableassertions>
    </viewalias>
    <tool name="reusableAssertionEditor">
    </tool>
</dataformat>
```

```xml
<?xml version="1.0" encoding="UTF-8"?>
<reusableassertions>
<reusableassertion name="IntegratorStability">
<description>This check creates a pair of assertions that check the stability of a second order Sigma Delta Modulator. Three connectivity points are to be specified, including the output nodes of the first and second integrators, and the reference voltage node. In addition, a value of the 'bounds' parameter can be specified, which is taken as a multiplier. If at any time any of the two integrator output voltages exceed the reference voltage multiplied by the bounds factor, this stability assertion will fail</description>
<tooltip>modulator stability assertion. Hook up the Out1 and Out2 nodes to first and second integrators, ref to the voltage reference, and specify a value of bounds (typically < 1.5)</tooltip>
<parameters>
<parameter name="Out1" type="node" description="First Integrator output" tooltip="integrator 1 output"/>
<parameter name="bounds" type="number" description="fraction of VDD" tooltip="scale multiplier"/>
<parameter name="Vref" type="node" description="Modulator Reference Voltage" tooltip="reference voltage"/>
<parameter name="Out2" type="node" description="Second Integrator output" tooltip="integrator 2 output"/>
</parameters>
<asserts>
<pslassert name="assert1" property="abs({{Out1}}) < {{bounds}}*{{Vref}}"/>
<pslassert name="assert2" property="abs({{Out2}}) < {{bounds}}*{{Vref}}"/>
</asserts>
</reusableassertion>
<reusableassertion name="InputRangeCheck">
...
</reusableassertion>
...
</reusableassertions>
```

SYSTEM AND METHOD FOR ASSERTION PUBLICATION AND RE-USE

CROSS REFERENCE TO RELATED APPLICATIONS

The present application is related to U.S. Ser. No. 14/064,059 entitled "System And Method For Analog Verification IP Authoring And Storage", filed on Oct. 25, 2013; this related patent application is hereby incorporated by reference in its entirety.

FIELD OF THE INVENTION

This description relates to the field of circuit simulation, and more precisely to more easily managing assertion-related information publication and re-use for analog and mixed-signal circuit designs.

BACKGROUND

The re-use of circuit designs has become an important trend in the integrated circuit design industry. Companies may exchange or license design intellectual property (or "design IP"), typically including schematic and layout information for commonly used circuit blocks. The creation of a new integrated circuit may thus be greatly simplified by assembling pre-designed circuit blocks into a nearly complete system, with minimal new design effort required.

Verification is an important step in the process of designing and creating an electronic product. Verification helps ensure that the electronic design will work for its intended purpose, and is usually performed at several stages of the electronic design process. Circuit designers and verification engineers use different methods and analysis tools to verify circuit designs, including simulation. Simulation verifies a design by monitoring computed behaviors of the design with respect to test stimuli. Circuit performance measurements may be performed by a post-simulation engine that evaluates simulated circuit waveforms. A variety of commercially offered software programs are available for circuit simulation.

Digital and mixed-signal simulators support a concept known as a verification unit or "vunit" in Property Specification Language (PSL) (or the System Verilog Assertions (SVA) "bindfile" equivalent). Verification units are containers of properties that describe the verification requirements of a circuit design. Verification units in the verification domain are thus rather analogous to modules or subcircuits, which are used to capture design information in the design domain. Verification units however capture verification information in a standalone entity or separate file from the circuit design itself. During simulation, the contents of a verification unit may be considered alongside corresponding modules or subcircuits of a circuit design, sometimes on a per-instance basis.

Recent additions to analog circuit design products have enabled users to enter analog PSL assertions and store them in a design suite alongside their circuit schematics. Writing PSL/SVA assertions does not however come naturally to many modern analog design tool users, given the text-based pedigree of these assertion languages. Most analog designers may instead prefer to use a graphical user interface (GUI) to point and click from a library of pre-written assertions.

Since analog assertion management tools are relatively new, such "publication for re-use" flows and interactive use models do not yet exist. Thus there is a need for an improved approach to managing assertion-related information. Accordingly, the inventors have developed a novel way to help circuit designers both publish and re-use assertion-related information for analog and mixed-signal circuit designs.

BRIEF DESCRIPTION OF THE DRAWINGS

FIG. 3 is a diagram of a property field of a PSL assertion in the assertion publication user interface, according to an embodiment.

FIG. 9 is an XML-based viewtype definition for data registry purposes, according to an embodiment.

FIG. 10 is an XML schema for a specific instance of a re-useable assertion view, according to an embodiment.

DETAILED DESCRIPTION

This description presents an easy to use system, method, and computer program product for managing analog assertion publication and re-use for analog and mixed-signal circuit designs. A graphical user interface based environment allows a user to create, verify, formalize, and publish an analog assertion for a circuit design while simultaneously depicting a circuit design in a schematic and/or a layout editor window. Embodiments facilitate the publication of verified analog checks and assertions in a naturally re-useable form by capturing referenced circuit objects and parameterizing the assertions for numerical values and connectivity.

Assertions may be published to a library or other standard location accessible to other users of analog design and verification tools, including other circuit designers. The initial creators of the assertions may be expert circuit designers, and they may annotate their published assertions with metadata describing the assertion use and application area. Embodiments also allow a group of assertions with related functionality to be published together as a single atomic entity for re-use.

Subsequently, other perhaps less-expert circuit designers may browse or search a library to find assertions of relevance to their current circuit design. These secondary users may then select and instantiate those relevant assertions to bind them to specific elements of their current design. The secondary users may then verify the re-used assertions for their current design, rather than creating their own assertions from scratch.

Figure 1:
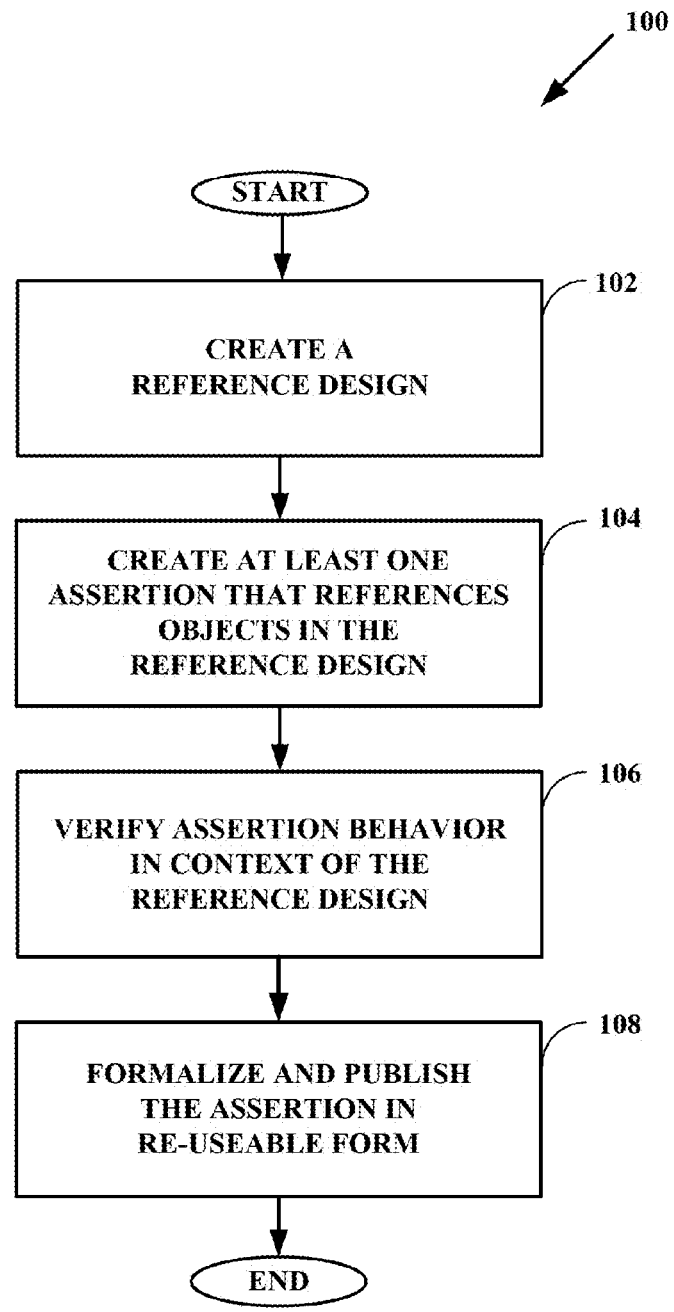
FIG. 1 is a flowchart of the assertion publication methodology, according to an embodiment.

FIG. 1 shows a flowchart of the assertion publication methodology 100, according to an embodiment. At 102, a first user, who may be an expert circuit designer, may create a reference circuit design. At 104, the first user may create at least one assertion that references objects in the reference circuit design. The user may use the design tool's assertions/constraints manager to create one or more leaf-level assertions or checks that work with the reference circuit design. At 106, the first user may verify the assertion behavior in the context of the reference circuit design, using existing verification tools. At 108, the first user may formalize and publish the assertion in re-useable form.

Figure 2:
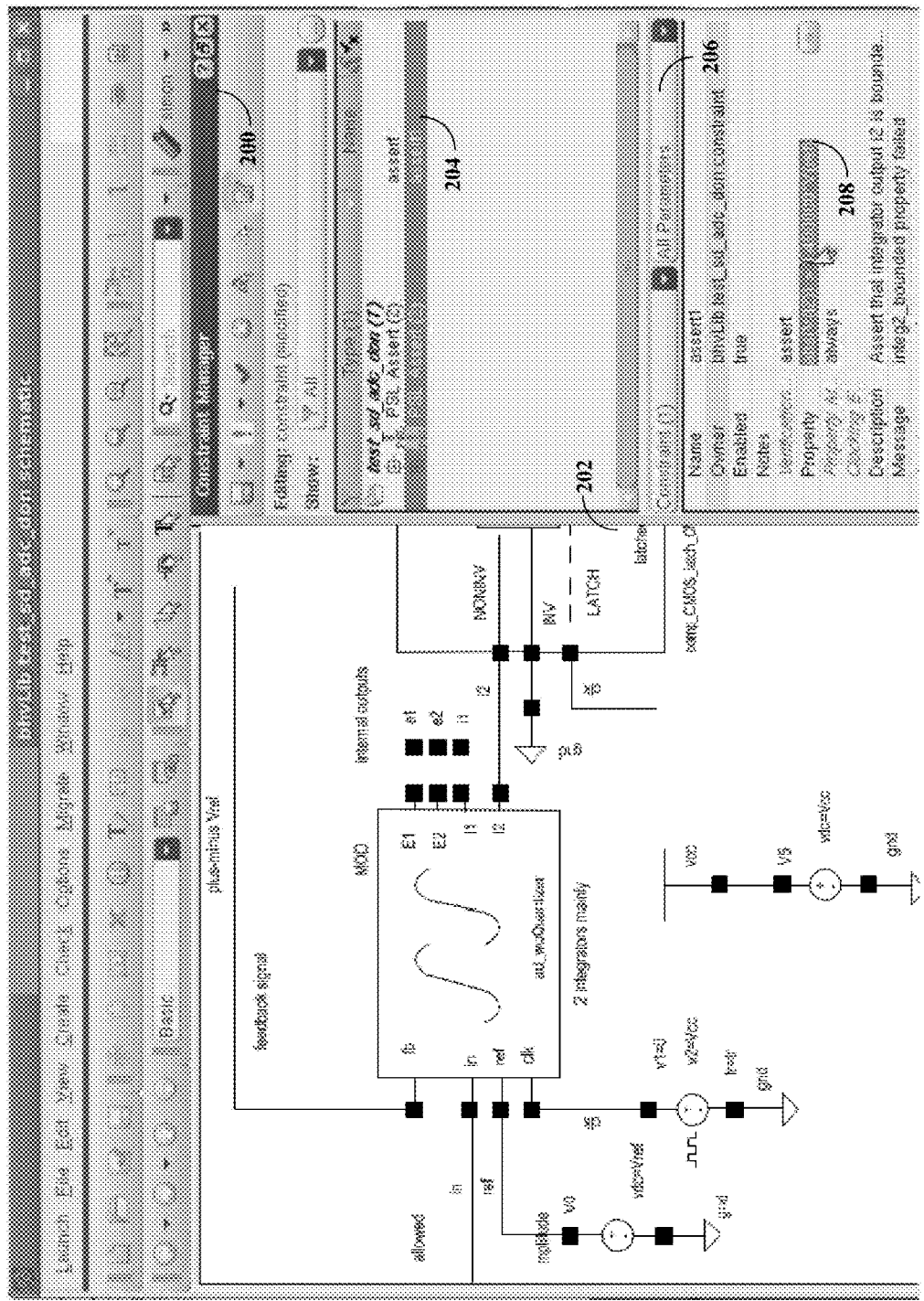
FIG. 2 is a diagram of a dedicated assertion user interface, according to an embodiment.

FIG. 2 shows a diagram of a dedicated assertion user interface 200, according to an embodiment. The assertion user interface 200 may comprise a GUI window for entering and storing analog checks and assertions, typically docked alongside and interactive with the very design environment used for creating a design in the first place. The assertion user interface may for example interact with the schematic canvas used for analog and mixed-signal circuit editing, as shown.

FIG. 2 depicts an exemplary creation of two PSL assertions. FIG. 2 also shows the assertion user interface 200 with one specific analog PSL assertion assert1 204, selected from a list of assertions shown in the constraint manager in the top portion of the interface 200. The underlying assertion details are then shown in the bottom portion 206 of the assertion user interface 200.

GUI fields and menus within the assertion user interface 200 may be used to enter the assertions. As the data is entered, the user may interact with the GUI components in both the assertion user interface 200 and within the design IP (e.g., via a schematic editor 202). Analog assertion IP may thus be entered by the person most qualified to create it, the analog design engineer, in a natural design environment. The data may be entered using the common schematic editor namespace that is familiar to analog IP designers.

FIG. 3 shows a diagram of a property field of a PSL assertion 204 in the assertion publication user interface 200, according to an embodiment. The design tool's constraint/assertions manager enables such assertions to be created, but requires the first user to enter the circuit-specific code for the PSL assertion expression in a property field 208 as shown highlighted in the bottom right of FIG. 2 and in more detail (under the mouse pointer) in FIG. 3.

In this example, the property shown for assertion 204 is that $abs(V(i2))>1.4*V(ref)$. The first user may then verify this assertion is working properly in the context of the reference circuit schematic. This verification may involve creating vunit files containing the assertion and simulating the reference circuit design along with those vunit files using an analog or mixed-signal circuit simulator, and possibly iterating (editing the schematic design and/or the assertion) until the desired design and assertion behavior is exhibited.

Figure 4:
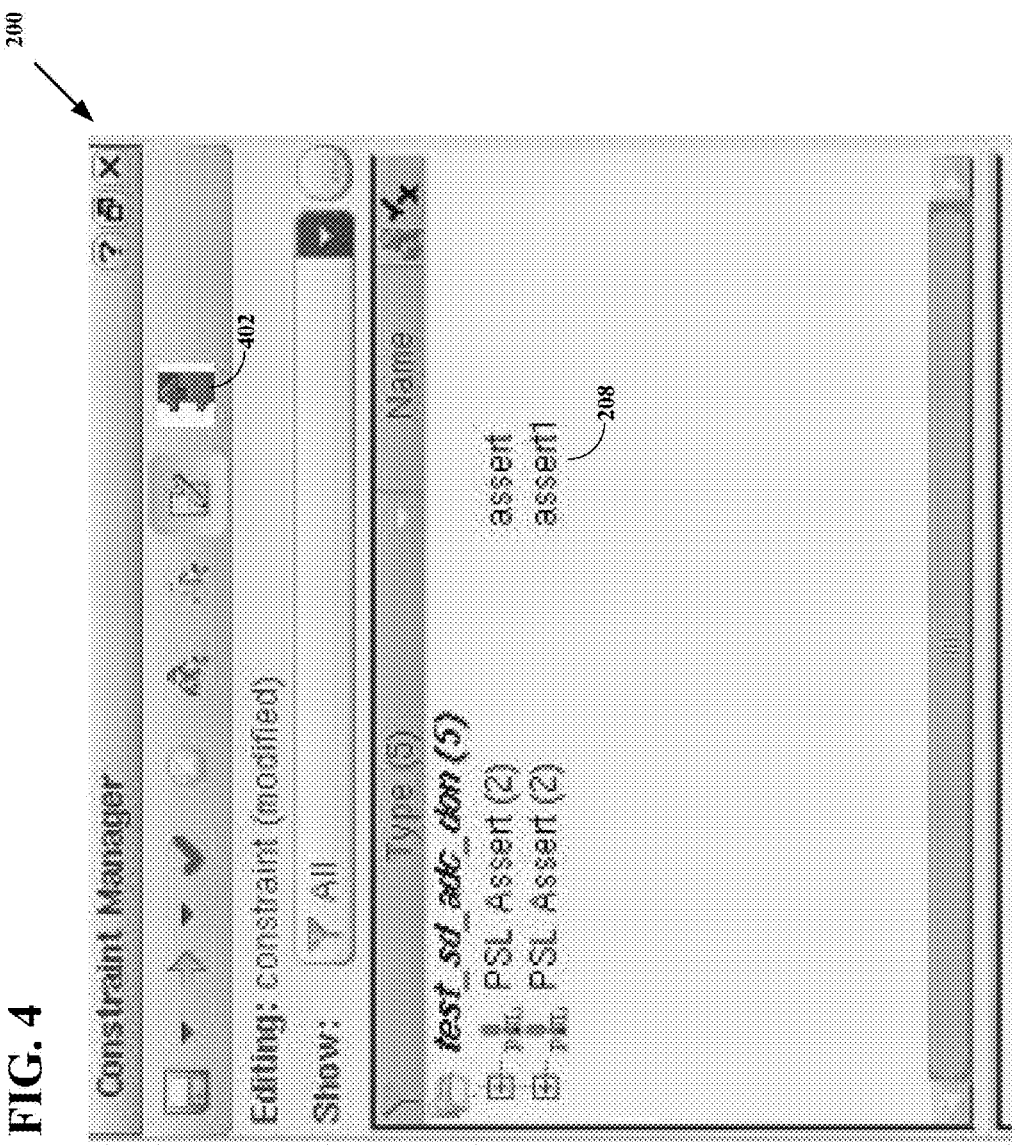
FIG. 4 is a diagram of an assertion editing assistant in the assertion user interface, according to an embodiment.

FIG. 4 shows a diagram of an assertion editing assistant in the assertion user interface 200, according to an embodiment. In this example, a design tool assertion/constraint manager may display a hierarchy of assertions, each of which may be selected for editing as previously shown in FIG. 3. After the initial assertion creation and verification is completed, the user may next select one or more of the assertions, and "Formalize & Publish" the selected assertions. In this example, a toolbar icon 402 triggers the "Formalize & Publish" action, but this action may also be selected from a menu such as a context menu.

Figure 5:
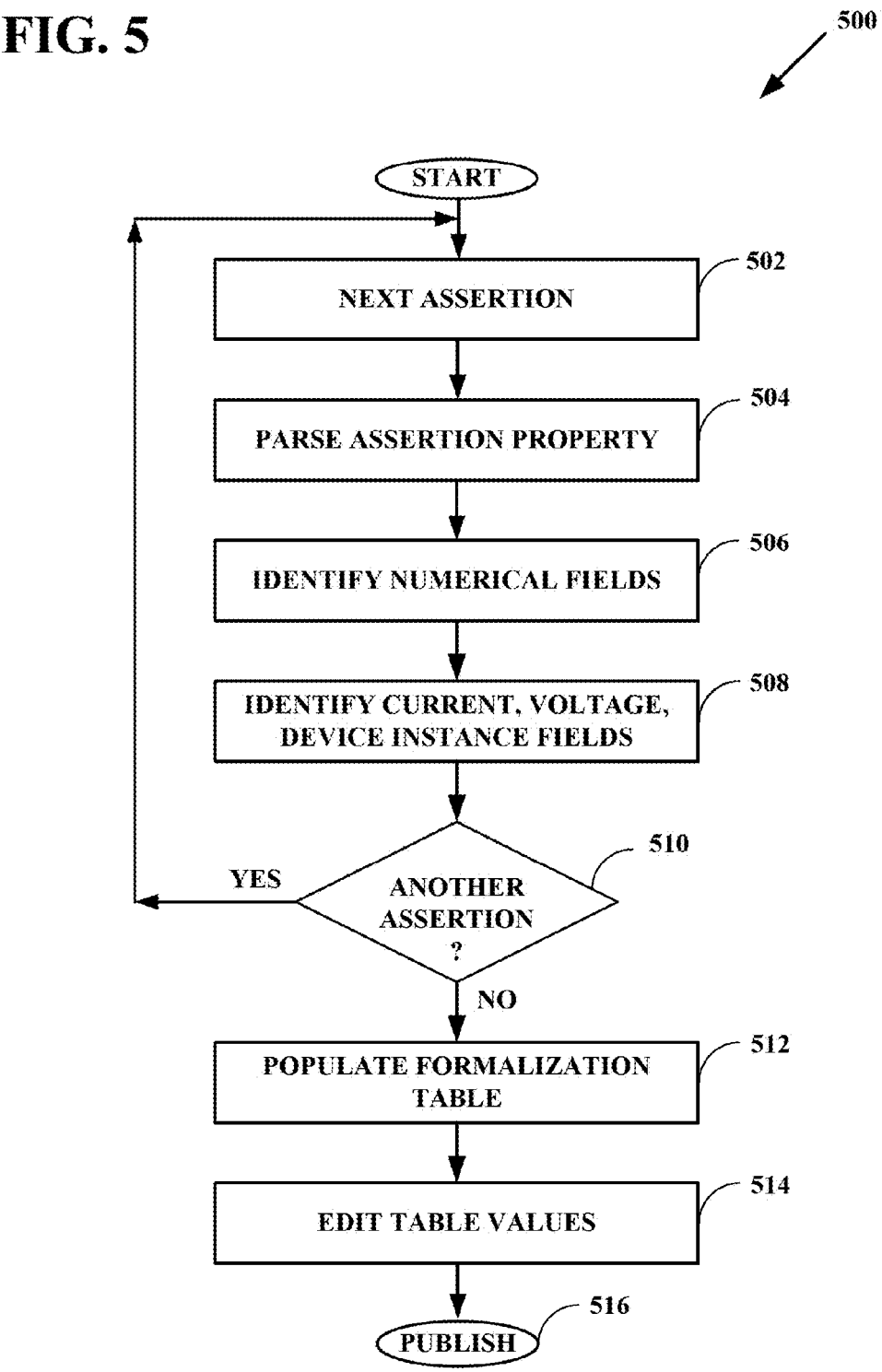
FIG. 5 is a flowchart of the assertion formalization and publication methodology, according to an embodiment.

FIG. 5 shows a flowchart of the assertion formalization and publication methodology 500, according to an embodiment. At 502, the next assertion to be published is input for review, for example one of the two PSL assertions in FIG. 4. At 504, the embodiment may parse the "Property" field of the assertion, such as the field over which the mouse pointer is shown in FIG. 3.

Embodiments may parse that field value to look for both numerical values (such as 1.4) at 506 and textual references to analog circuit connectivity, such as voltages, currents, or circuit instances like transistors, resistors, etc. at 508. In the example of FIG. 3, parsing for textual references including the voltage/current expressions V( ) and I( ) respectively returns two matches, with the values being "i2" and "ref" respectively.

When multiple assertions are being published at once as an atomic group, the property fields of each of the assertions may be parsed in a similar manner at 510, for numerical constants and electrical connectivity. The parser may look for circuit-specific values that are candidates to be "templatized" or parameterized for re-use. At 512, these values populate a formalization table, to be described. At 514, the formalization table values may be edited. At 516, the first user may decide to publish the assertion or assertion group.

Figure 6:
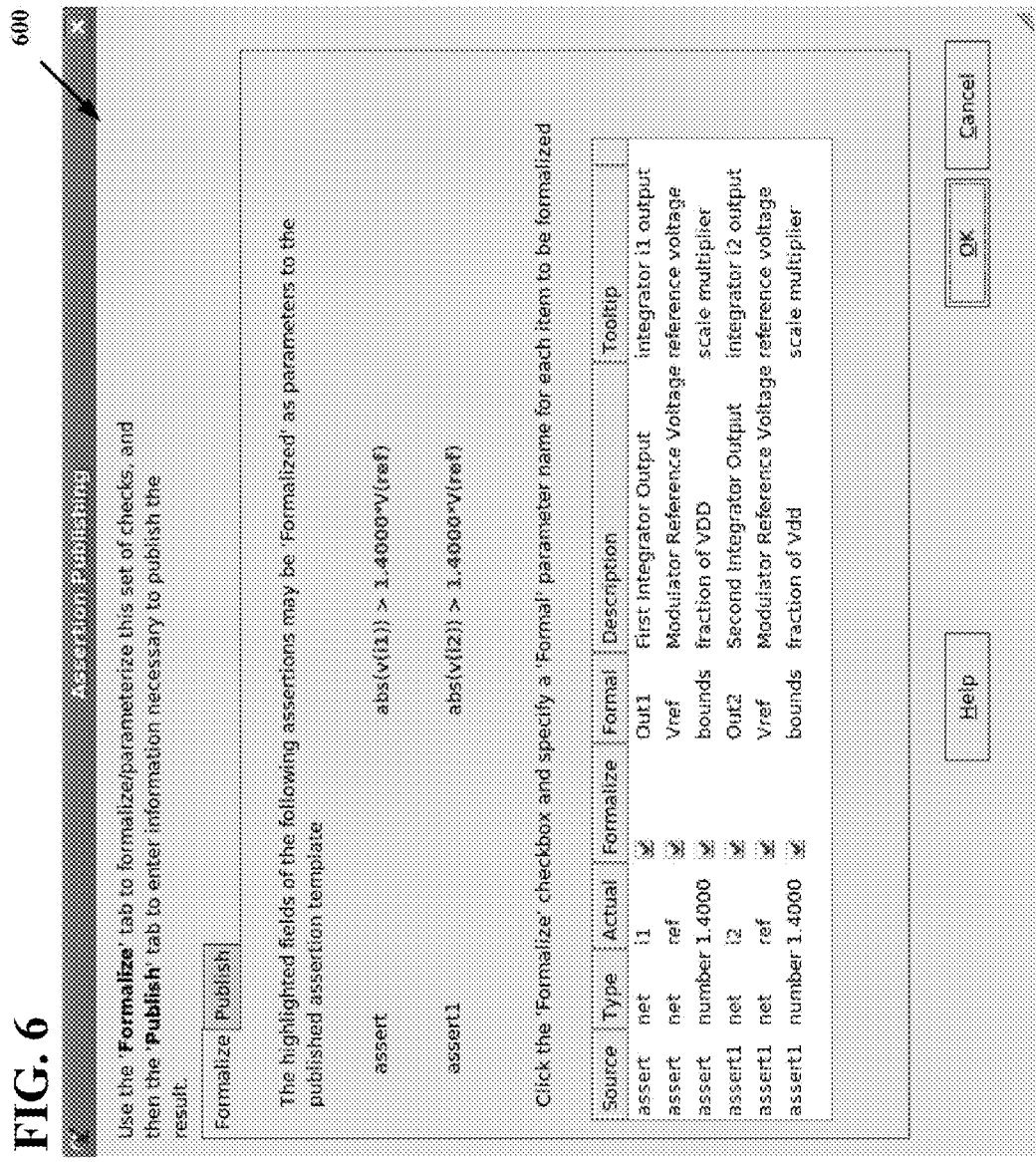
FIG. 6 is a diagram of a Formalize tab of an assertion publishing form, according to an embodiment.

FIG. 6 shows a diagram of a Formalize tab 600 of an assertion publishing form, according to an embodiment. The embodiment may populate the form based on the information parsed from the inspected assertion properties, and present it to the first user to help with the formal parameterization and publication process. The FIG. 6 form is divided into two distinct tabs, reflecting the two major operations required when publishing a set of assertions for re-use.

The "Formalize" tab of the form first presents the "property" values of the assertion property fields to the first user. In this example there are two different property fields that may be formalized as parameters to the published assertion template. The elements therein that were determined to be eligible for parameterization purposes are shown highlighted in bold font, e.g., i1, ref, and 1.4 as shown in the top half of FIG. 6.

The formal/property table is shown below the two assertion listings. It contains the following columns:

Source: The name of the source assertion item to be considered for formal parameterization.

Type: The type of the corresponding object, for example schematic net, instance, numerical value, etc. Schematic nets and instances may be considered as connectivity parameters.

Actual: The actual object name (corresponding to one of the objects highlighted in bold font in the assertion property listings above the table, e.g., i1, ref, and 1.4) as found in the reference design.

Formalize: A checkbox field indicating whether this object name/value is to remain hardcoded (unchecked), or become a formal parameter (checked). All connectivity objects are expected to become parameterized in order for this hierarchical check to be re-usable on a different design. A warning may be issued when approving the form to publicize if any connectivity parameter does not have its "Formalize" checkbox checked.

Formal: This is to be the name of the formalized parameter. This name, along with its corresponding tooltip and description fields, will later appear in the assertion re-use form that is dynamically constructed based on the information entered here when a second user subsequently attempts to instantiate this assertion and bind it to his design, to be shown in FIG. 13. The second user's design may be different from the reference design, though possibly in a similar application area.

Description: This is a detailed description of the field value that the second user can query by pressing the "Help" button of the dynamically created assertion re-use form, to be shown in FIG. 14.

Tooltip: This is the value that will appear to the eventual end-user (e.g., the second user) of the form when he places the mouse pointer over the associated combo box using the dynamically created assertion re-use form, to be shown in FIG. 14.

Figure 7:
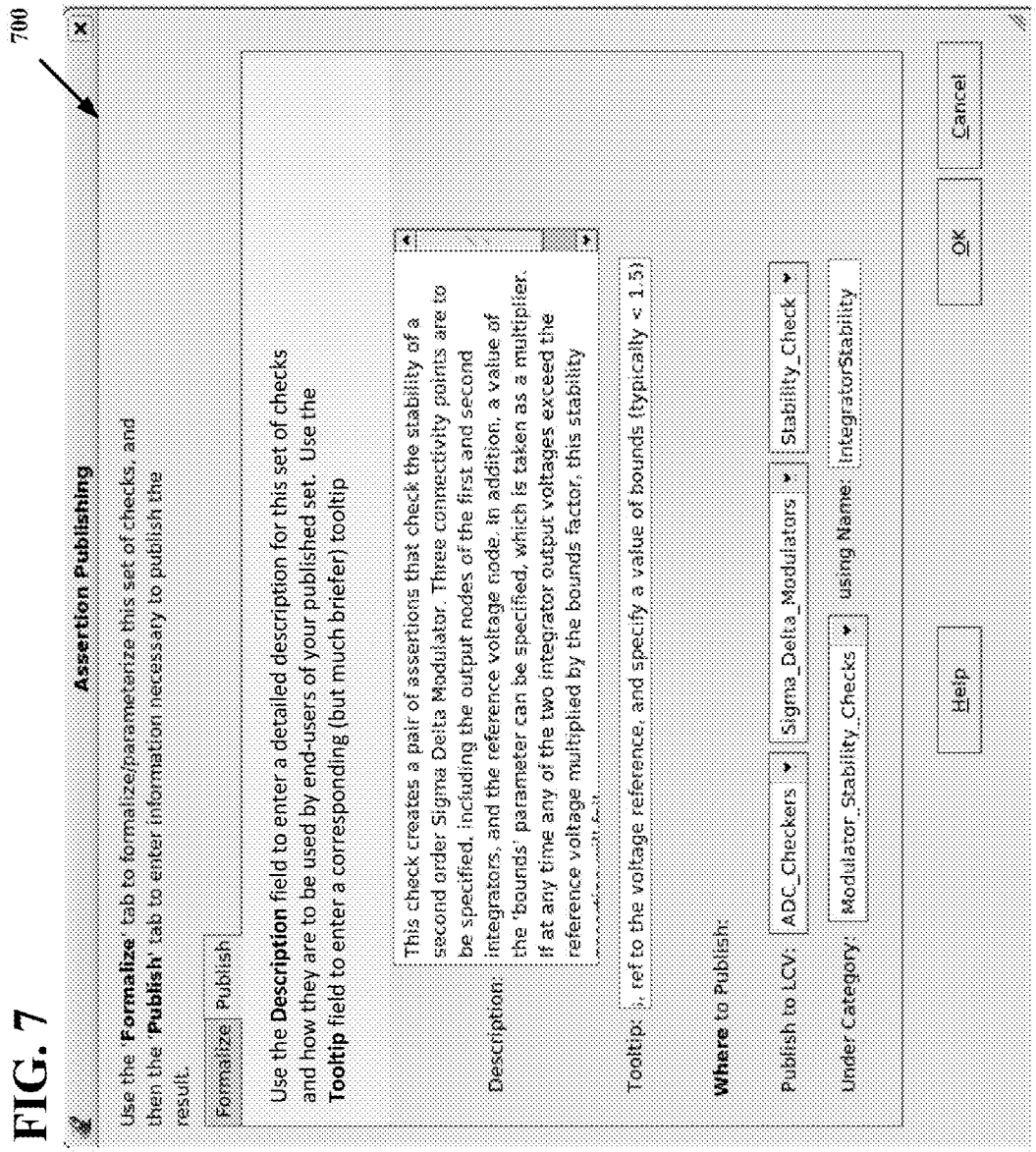
FIG. 7 is a diagram of a Publish tab of an assertion publishing form, according to an embodiment.

FIG. 7 shows a diagram of a Publish tab 700 of an assertion publishing form, according to an embodiment. Here the author of the set of assertions is expected to enter a detailed description for what this set of assertions/checks does, their application area etc., along with a helpful but more brief tooltip description. The description and tooltip information may be used by the eventual end-user (e.g., a second designer) subsequently browsing or searching the published assertions library for assertions that are suitable for use with his design.

The "Where to Publish" section is where the first user decides to publish this information, e.g., to a new or existing tool Library/Cell/View (LCV). The "Under Category" information is optional, allowing for a tool "category" (as may be used by library manager applications common to the art) information to be specified. This information, if specified, helps the eventual end-user find the assertion in the library of such pre-published assertions.

Finally, the "using Name" field of FIG. 7 may allow the newly templatized assertion or assertion group to be named (e.g., "IntegratorStability").

Figure 8:
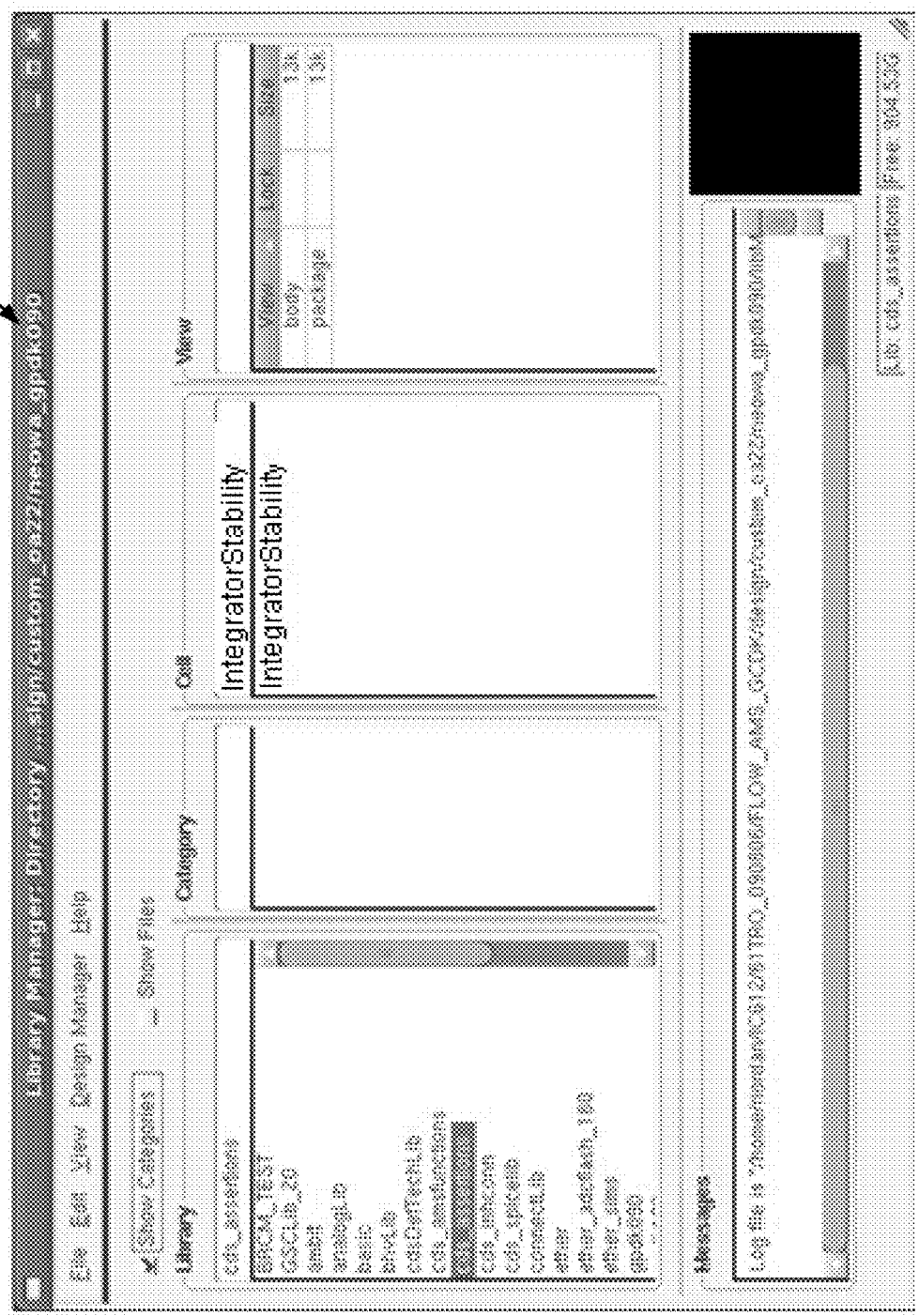
FIG. 8 is a diagram of a design tool library manager, according to an embodiment.

FIG. 8 shows a diagram of a design tool library manager 800, according to an embodiment. This particular screenshot illustrates that the "IntegratorStability" set of checks was published to the "cds assertions" assertion library. The library manager may search for re-useable assertions in a number of libraries.

FIG. 9 shows an XML-based viewtype definition 900 for data registry purposes, according to an embodiment. Other non-XML representations may also be used in other embodiments. The new viewtype may be registered with the tool framework, to publish and store assertions to a new tool Library/Cell/View. The new viewtype may be registered with the tool framework as a new viewtype with associated files.

Cell views of the new viewtype may contain data representing one or more published and thus re-useable assertions/checks. In essence, they may contain the raw data entered by the publication author using the tables and text fields in the screenshots of FIGS. 6 and 7. In one embodiment, this data may be outputted in XML format, though other formats may be used in other embodiments.

The data registry entry for this new view type may be as shown in FIG. 9 and may be placed in the same installation directory as other pre-defined view types within the tool's installation hierarchy. FIG. 9 states that a new data format exists for the tool, of type reusableAssertionData. The view containing this data is of type reusableAssertions and contains two files in the co-managed set (the set managed by the design manager system), which are reusableassertions.xml and master.tag respectively. The master.tag file points at the reusableassertions.xml file as the master data for this viewtype. When cell views of this type are double clicked in a library manager application, the corresponding data may be opened by a tool called ReuseableAssertionEditor, which may be further registered with the design environment as a new application for editing data of this type.

The ReusableAssertionEditor tool may be responsible for create/read/update/delete operations on the reusableassertions.xml file. The XML schema used for the reusableassertions.xml file may be as shown in the following example.

FIG. 10 shows an XML schema 1000 for a specific instance of a re-useable assertion view, according to an embodiment. This schema contains fields for the description and tooltip information entered on the Publish tab of the assertion publishing form of FIG. 7, in addition to the parameter formalization information from the following columns of the parameter formalization table of FIG. 6:

Formal (Name)
Type
Description
Tooltip

The Type attribute is notable as it may be used to dynamically populate the drop down fields of the assertion re-use form (to be shown in FIG. 13) with the correspondingly typed circuit values from the second user's circuit design. In addition, the assertion properties (e.g., those that were selected to begin the "formalize and publication" process) are contained within the <asserts> element, with a special {{<parameter-name>}} syntax used to represent the placeholder parameters. Other syntaxes may be used in other embodiments.

For example, in the example XML listed in FIG. 10, there are two assertions listed within the <pslassert> elements. The first of these has the property definition as follows:
Property="abs({{Out1}})<{{bounds}}*{{Vref}}"

Note that this expression property contains references (shown here in bold font) to three of the four formal parameters in the <parameters> element of the XML, specifically:

Out1
bounds
Vref

Figure 13:
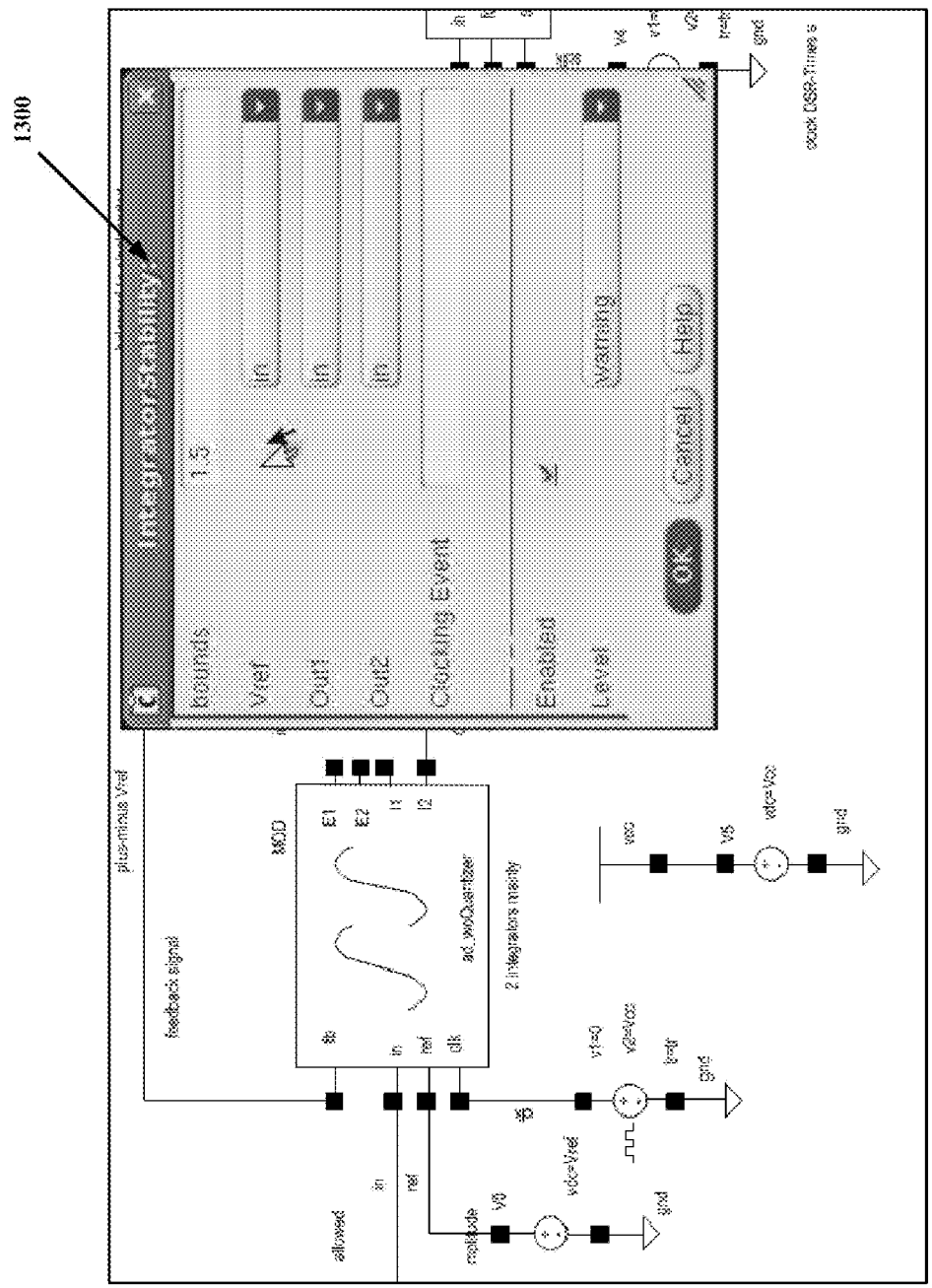
FIG. 13 is a diagram of a dynamically generated numerical value input form, according to an embodiment.

The use of the special double brace template notation identifies the placeholder elements that are to be substituted with actual circuit values as the second user binds the template to his own circuit design via the dynamically generated assertion re-use form (such as the IntegratorStability form to be shown in FIG. 13). Note that multiple re-useable assertions may be maintained within a single file; the example shown has provision for a second, re-useable assertion "InputRangeCheck" (the contents of which are not shown).

Providing Access to Published Assertions

Figure 11:
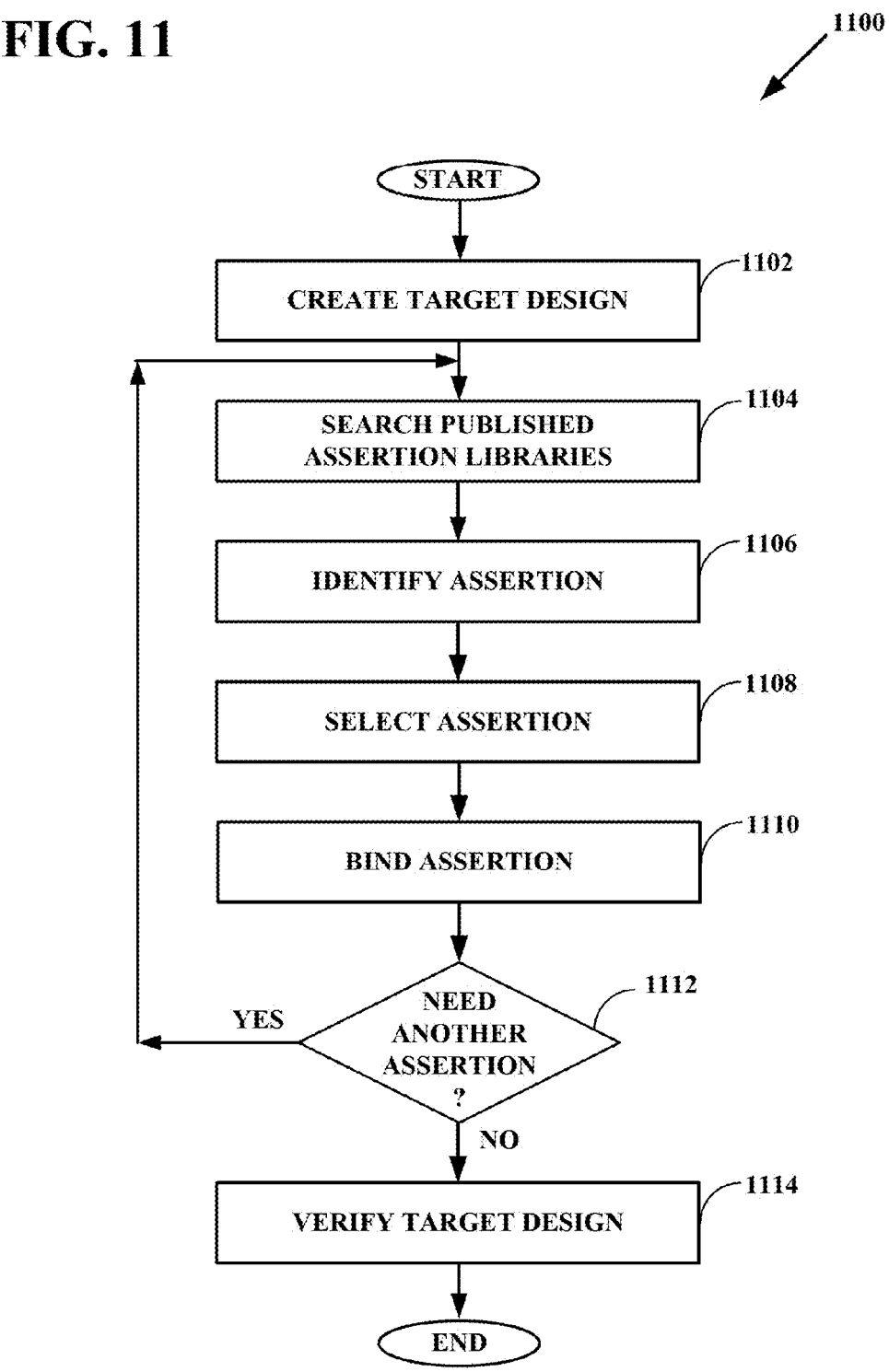
FIG. 11 is a flowchart of the assertion re-use methodology, according to an embodiment.

FIG. 11 shows a flowchart of the assertion re-use methodology 1100, according to an embodiment. At 1102, a second user may create a target circuit design. The second user may be the same person as the first user who created an assertion for a reference circuit design, but in most instances will not be. At 1104, the second user may search published assertion libraries for assertions/checks that may be relevant to the target circuit design. The target circuit design may be the same as the reference circuit design, but in most instances will not be. At 1106, the second user may identify a relevant assertion.

At 1108, the second user may select the identified assertion for use with his target circuit design. At 1110, the second user may bind the identified assertion to the target circuit design. At 1112, the second user may determine whether another assertion is necessary, and if so, may return flow to 1104. Otherwise, at 1114, the target design is verified using all of the bound assertions.

Figure 12:
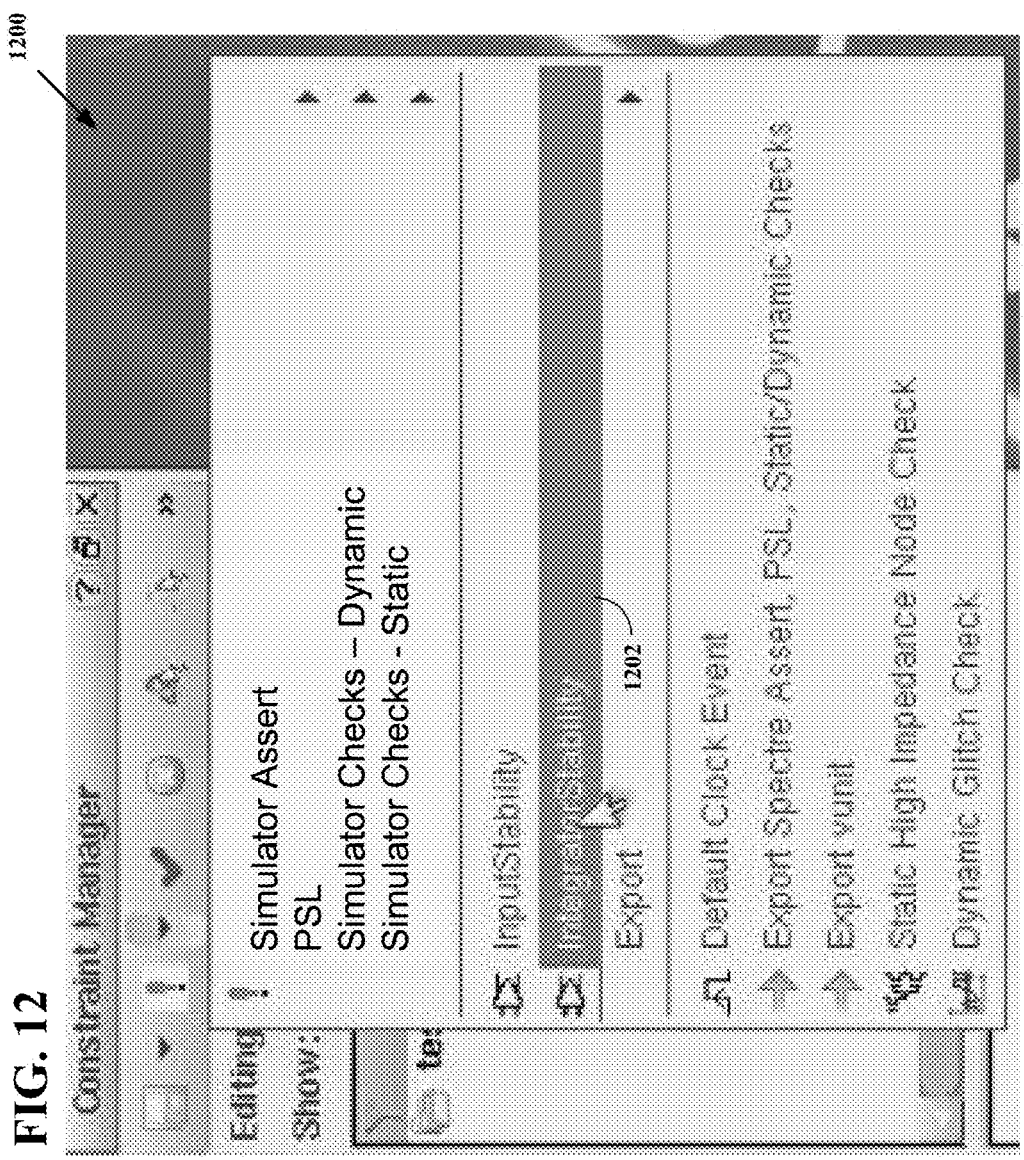
FIG. 12 is a diagram of a menu enabling selection of available assertions, according to an embodiment.

FIG. 12 shows a diagram of a menu 1200 enabling selection of available assertions, according to an embodiment. End users (such as the second circuit designer) need to be able to access the library of published assertions. Since the assertion manager knows (by viewtype) about which assertions are available in the library, it may present the relevant ones via the menu structure shown in FIG. 12. In another embodiment, a hierarchical system of cascading menus is used, reflected in the Library/Cell/View organization specified in FIG. 7. In yet another embodiment, direct drag and drop support from the library manager of FIG. 8 is also supported. In a further embodiment, this system also allows a user to search for assertions of the appropriate type, where the search operation is exposed to the data stored in the description and tooltip fields of FIG. 7.

FIG. 12 shows an example of the second user selecting the previously published IntegratorStability check 1202 from a dropdown menu in an assertions/constraint manager assistant. This menu may be dynamically populated with the list of relevant pre-published assertions for the second user's circuit design type or application area. Once the second user selects such a check, an automatically-generated assertion re-use form may appear as shown in FIG. 13.

FIG. 13 shows a diagram of a dynamically generated numerical value input form 1300, according to an embodiment. With this form, the second user is now able to enter/edit a numerical value for the formal "bounds" parameter (for example 1.5, as shown), and specify electrical bindings to his target circuit. The target circuit may be a different implementation from the first reference circuit originally used to author the re-useable assertion.

Figure 14:
FIG. 14 is a diagram of application-specific value entry into an input form, according to an embodiment.

FIG. 14 shows a diagram of application-specific value entry into an input form 1400, according to an embodiment. In FIG. 14, the second user has specified electrical bindings for the Vref, Out1, and Out2 formal connections in addition to resetting the "bounds" parameter back to its published value of 1.4.

Figure 15:
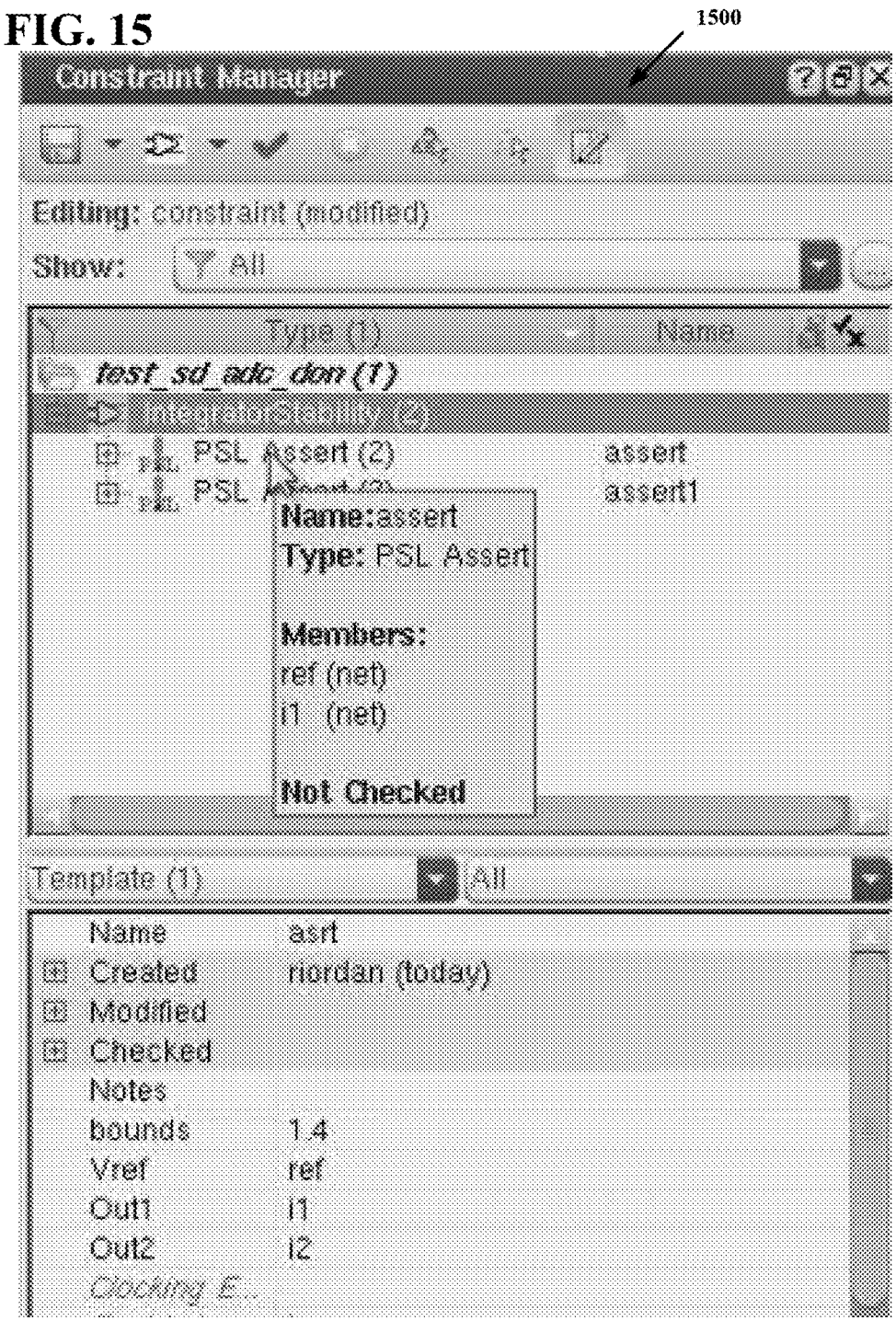
FIG. 15 is a diagram of assertion template instantiation, according to an embodiment.

FIG. 15 shows a diagram of assertion template instantiation 1500, according to an embodiment. When the "OK" button of FIG. 14 is pressed, a compound hierarchical assertion template may be instantiated, as shown in FIG. 15. The table at the bottom of FIG. 15 shows the numerical and connectivity values that the second user entered via the form of FIG. 14.

Note that the single instantiation of the "IntegratorStability" check or group itself (as shown in FIG. 12) and the subsequent entry of application-specific values (as shown in FIG. 14 and FIG. 15) caused the original two sub-assertions to be instantiated, each of type PSL Assertion. These two sub-assertions are now bound to the second user's target circuit. Selection of one of the PSL assertions shows some of its details, as shown in FIG. 16.

Figure 16:
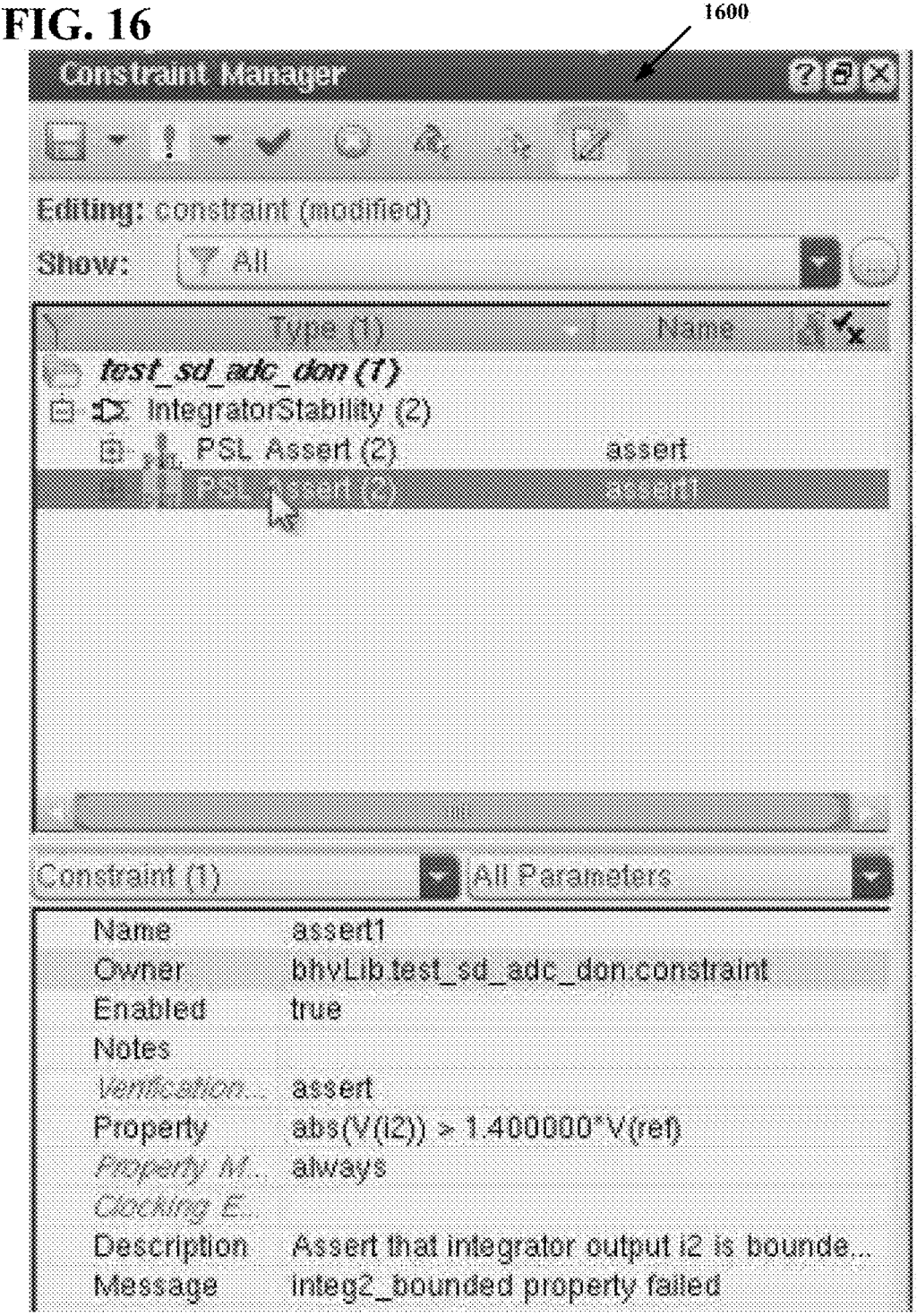
FIG. 16 is a diagram of sub-assertion selection from a hierarchical assertion, according to an embodiment.

FIG. 16 shows a diagram of sub-assertion selection from a hierarchical assertion, according to an embodiment. After instantiating and binding one or more such assertions to the second circuit design, the second user may proceed to verify his circuit design. The verification tool may netlist and simulate the second circuit in the context of the instantiated assertions, which may be converted to vunit form and supplied to the analog/mixed signal circuit simulator.

To summarize, the embodiments of the present invention enable a first user to create and publish analog assertion IP for re-use in an environment that is familiar to analog designers. A second user may then easily search for and use relevant assertions from the provided libraries via GUI point and click operations, with no code writing skills required. Special care is taken to capture the type of circuit objects referenced by the assertions in the reference circuit design, so that only objects of the same type are presented to a second user later instantiating the published assertion.

The second user may search the libraries of published assertions to find those that are relevant to a second circuit design, instantiate those published assertions deemed relevant, and verify the second circuit design the context of those re-useable assertions. The second user may be prompted to bind the re-useable assertion to the specific circuit elements of the appropriate type within the second circuit design. Embodiments specifically cater to the needs for both the assertion authoring for re-use in a "softened" (parameterized) form and for the eventual re-use to be completely driven by a point and click GUI model with dynamically populated forms. Storage formats and processes described operate well within the format of existing tools.

Figure 17:
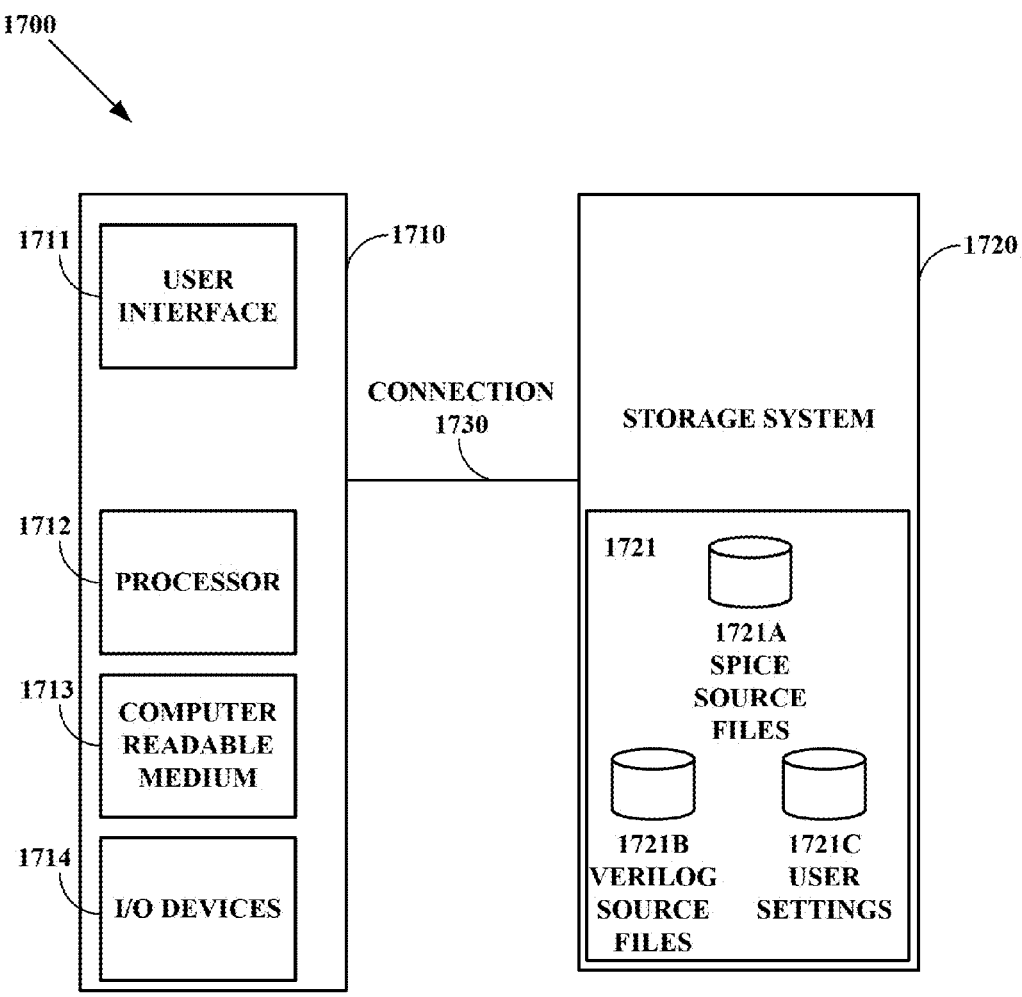
FIG. 17 is a block diagram of a circuit analysis system, according to an embodiment.

FIG. 17 shows a block diagram of an exemplary circuit analysis system 1700, according to an embodiment. This system may provide simulator functionality for any of the methods described above. A user may access the system 1700 through a standalone client system, client-server environment, or a network environment. System 1700 may comprise one or more clients or servers 1710, one or more storage systems 1720, and a connection or connections 1730 between and among these elements.

Client 1710 may execute instructions stored on transitory or non-transitory computer readable medium 1713 with processor 1712, and may provide a user interface 1711 to allow a user to access storage system 1720. The instructions may be part of a software program or executable file that may operate electronic design automation (EDA) software. Client 1710 may be any computing system, such as a personal computer, workstation, mobile computer, or other device employing a processor which is able to execute programming instructions. User interface 1711 may be a GUI run in a user-controlled application window on a display. A user may interact with user interface 1711 through one or more input/output (I/O) devices 1714 such as a keyboard, a mouse, or a touch screen.

Storage system 1720 may take any number of forms, including but not limited to a server with one or more storage devices attached to it, a storage area network, or one or a plurality of non-transitory computer readable media. Databases 1721 may be stored in storage system 1720 such that they may be persistent, retrieved, or edited by the user. Databases 1721 may include SPICE source files 1721A, Verilog source files 1721B, and a user input database 1721C for example. These databases may be kept as separate files or systems, or may be merged together in any appropriate combination.

Only one client 1710 is shown connected to storage system 1720 through connection 1730, which may be a simple direct wired or wireless connection, a system bus, a network connection, or the like, to provide client 1710 with access to storage system 1720. In another aspect, connection 1730 may enable multiple clients 1710 to connect to storage system 1720. The connection may be part of a local area network, a wide area network, or another type of network, again providing one or more clients with access to storage system 1720. Depending on system administrator settings, client 1710's access to system storage 1720 or to other clients may be limited.

Figure 18:
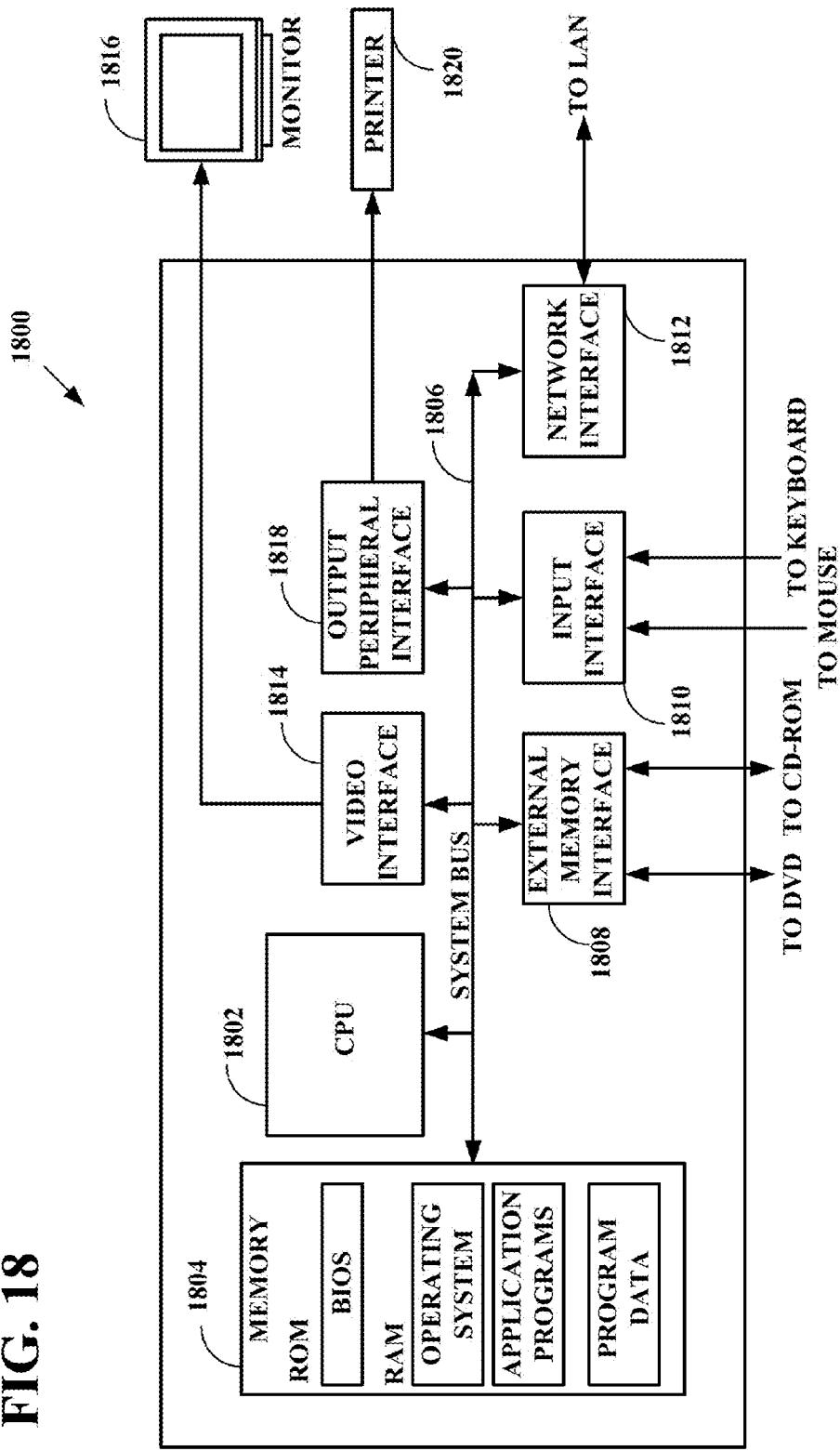
FIG. 18 is a diagram of a computer system, according to an embodiment.

FIG. 18 depicts an exemplary computer system comprising the structure for implementation of the embodiments described above. Computer system 1800 comprises a central processing unit (CPU) 1802 that processes data stored in memory 1804 exchanged via system bus 1806. Memory 1804 typically includes read-only memory, such as a built-in operating system, and random-access memory, which may include an operating system, application programs, and program data. Computer system 1800 also comprises an external memory interface 1808 to exchange data with a DVD or CD-ROM for example. Further, input interface 1810 may serve to receive input from user input devices including but not limited to a keyboard and a mouse. Network interface 1812 may allow external data exchange with a local area network (LAN) or other network, including the internet. Computer system 1800 also typically comprises a video interface 1814 for displaying information to a user via a monitor 1816. An output peripheral interface 1818 may output computational results and other information to output devices including but not limited to a printer 1820.

Computer system 1800 may comprise for example a personal computer or an engineering workstation, each of which is widely known in the art and is commonly used for integrated circuit design tasks, along with software products commercially available for performing computer-aided integrated circuit design tasks. Computer system 1800 may also comprise a mobile computer, including for example a tablet computer or a smart phone. The computer system of FIG. 18 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A processor-implemented method for managing analog assertion publication and re-use, the method comprising:
    using a processor:
        creating at least one analog assertion for a first circuit design;
        verifying the at least one analog assertion for the first circuit design;
        formalizing the at least one analog assertion including parameterizing the at least one analog assertion for numerical values and connectivity; and
        storing the at least one analog assertion in at least one library associated with analog design and verification tools for subsequent use of the at least one analog assertion with at least a second circuit design.

2. The method of claim 1 wherein the formalizing further comprises parsing the at least one analog assertion for textual references to analog circuit connectivity objects in the first circuit design.

3. The method of claim 1 wherein the storing further comprises annotating the at least one analog assertion with descriptive metadata.

4. The method of claim 1 wherein the storing further comprises outputting a group of a plurality of analog assertions, of related functionality, as a single entity.

5. The method of claim 1 further comprising using the at least one analog assertion with at least the second circuit design by:
    searching a plurality of the stored assertions in the at least one library;

selecting at least one of the stored assertions that is relevant to at least the second circuit design;

instantiating the at least one selected assertion;

binding the at least one selected assertion to specific elements of the second circuit design; and verifying the at least one selected assertion for the second circuit design.

6. The method of claim 1 wherein a first user performs the storing and a second user performs the using, and wherein at least one of the first user and the second user use an assertion management user interface.

7. A non-transitory computer readable medium storing instructions that, when executed by a processor, perform a method for managing analog assertion publication and re-use, the processor-implemented method comprising:

creating at least one analog assertion for a first circuit design;

using the processor, verifying the at least one analog assertion for the first circuit design;

formalizing the at least one analog assertion including parameterizing the at least one analog assertion for numerical values and connectivity; and storing the at least one analog assertion in at least one library associated with analog design and verification tools for subsequent use of the at least one analog assertion with at least a second circuit design.

8. The medium of claim 7 wherein the formalizing further comprises parsing the at least one analog assertion for textual references to analog circuit connectivity objects in the first circuit design.

9. The medium of claim 7 wherein the storing further comprises annotating the at least one analog assertion with descriptive metadata.

10. The medium of claim 7 wherein the storing further comprises outputting a group of a plurality of analog assertions, of related functionality, as a single entity.

11. The medium of claim 7 further comprising using the assertion by:

searching a plurality of the stored analog assertions in the at least one library;

selecting at least one of the stored analog assertions that is relevant to at least the second circuit design;

instantiating the at least one selected assertion;

binding the at least one selected assertion to specific elements of the second circuit design; and verifying the at least one selected assertion for the second circuit design.

12. The medium of claim 7 wherein a first user performs the storing and a second user performs the using, and wherein at least one of the first user and the second user use an assertion management user interface.

13. A system for managing analog assertion publication and re-use, comprising:

a memory storing executable instructions; and a processor executing instructions to:

create at least one analog assertion for a first circuit design;

verify the at least one analog assertion for the first circuit design;

formalize the at least one analog assertion including parameterizing the at least one analog assertion for numerical values and connectivity; and store the at least one analog assertion in at least one library associated with analog design and verification tools for subsequent use of the at least one analog assertion with at least a second circuit design.

14. The system of claim 13 wherein the formalizing further comprises parsing the at least one analog assertion for textual references to analog circuit connectivity objects in the first circuit design.

15. The system of claim 13 wherein the storing further comprises annotating the analog assertion with descriptive metadata.

16. The system of claim 13 wherein the storing further comprises outputting a group of a plurality of analog assertions, of related functionality, as a single entity.

17. The system of claim 13 further comprising executing instructions to use the analog assertion by:

searching a plurality of the stored analog assertions in the at least one library;

selecting at least one of the stored analog assertions that is relevant to a second circuit design;

instantiating the at least one selected assertion;

binding the at least one selected assertion to specific elements of the second circuit design; and verifying the at least one selected assertion for the second circuit design.

* * * * *